United States Patent [19]

Skinner, II et al.

[11] Patent Number: 5,657,197

[45] Date of Patent: Aug. 12, 1997

[54] OPERATIVE LIGHTNING PROTECTION SYSTEM

[76] Inventors: William H. Skinner, II, 5 Fairway Dr., Middle Island, N.Y. 11953; John Murtha, Jr., R.R. 2, Jacob's La., Wading River, N.Y. 11792

[21] Appl. No.: 657,384

[22] Filed: Jun. 3, 1996

[51] Int. Cl.$^6$ ................................................. H02H 1/04
[52] U.S. Cl. ................................................. 361/117; 174/3
[58] Field of Search ........................ 361/117–119, 121, 361/56, 91; 52/115; 174/3

[56] References Cited

U.S. PATENT DOCUMENTS 1,221,723   4/1917   Guichard .................................. 52/115

Primary Examiner—Jeffrey A. Gaffin
Assistant Examiner—Michael J. Sherry
Attorney, Agent, or Firm—Myron Amer P.C.

[57] ABSTRACT

As part of the operating mode of a lightning protection system in which lightning rods are moved from concealed positions to deployed positions as required for use in a storm with lightning phenomena, a testing procedure which monitors the movement noted during the long intervals which usually transpire between such storms to assure operability when needed, and which testing is done at night when the deployed positions are not aesthetically and otherwise objectionable.

1 Claim, 1 Drawing Sheet

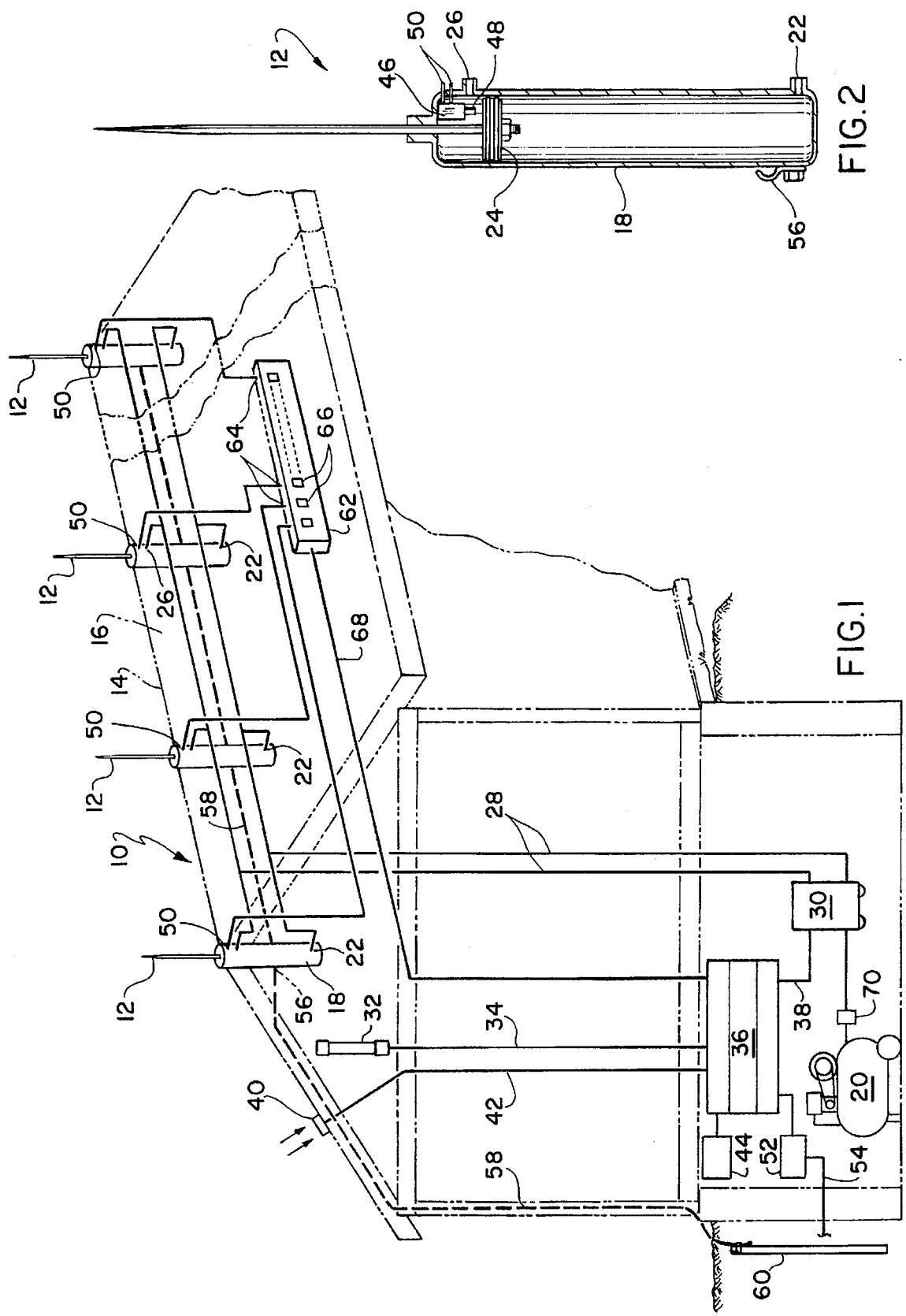

OPERATIVE LIGHTNING PROTECTION SYSTEM

The present invention generally relates to improvements in a lightning protection system for a dwelling or the like, the improvements more particularly assuring the operability of the system when needed, despite typically long intervals of non-use during which malfunctions can occur.

EXAMPLE OF THE PRIOR ART

Although denoted as a "Telescopic Mast" in U.S. Pat. No. 1,221,723 issued to Marcel Guichard on Apr. 3, 1917, an end use or utility thereof that is not precluded is "for the reception of electric atmospheric actions and for all applications of the same kind", as noted at page 1, lines 12–14, and thus the end use of serving as a part of a lightning protection system. Moreover, from the Guichard patent it is known that the mast or lightning rod equivalent has two operable positions, one that is a position of retraction within a pneumatic cylinder, and the other a raised position of deployment extending from the cylinder, these positions resulting from pressure applied against a side of a piston providing the direction of the ascending or descending movement that is desired.

Although generally informing for a lightning rod protection system, Guichard has significant shortcomings, one significant such shortcoming being an assurance that at the time of need it will function for the purposes intended.

Broadly, it is an object of the present invention to provide a lightning protection system overcoming the foregoing and other shortcomings of the prior art.

More particularly, it is an object to embody an operating mode in the lightning protection system that is used during intervals of non-use for actual lightning protection, i.e. during an actual lightning storm, that assures that during an actual lightning storm the system will provide the protection against the adverse consequences of lightning strikes that is desired.

Underlying the present invention is the recognition that a lightning rod protection system or device is an infrequently used device and, thus, vulnerable to undetected malfunctioning that might undermine its use when needed, and proposes the advantageous use of its lightning-neutralizing operating mode to assure its condition of operability. Stated somewhat differently, the prior art infrequently used lightning protection system is, according to the present invention, frequently used, and wherein such frequent use is under conditions of safety and in compliance with aesthetic conditions, all as will be better understood as the description proceeds.

The description of the invention which follows, together with the accompanying drawings should not be construed as limiting the invention to the example shown and described because those skilled in the art to which this invention appertains will be able to devise other forms thereof within the ambit of the appended claim.

FIG. 1 is a schematic illustration of a lightning protection system to which there is applied means for testing the operability thereof according to the present invention; and FIG. 2 is a sectional detail of a lightning rod and its cylindrical housing.

It is already well-known in order to safeguard a dwelling 10 against fire damage as might be caused by a lightning strike, to deploy typically fifteen equally spaced lightning rods, individually and collectively designated 12, along a ridge line 14 of the dwelling roof 16 which have an operating mode in which each lightning rod 12, operating in unison with the other rods, has an operative retracted position within a cooperating cylindrical housing 18 when not in use and an operative raised position of deployment as shown in FIGS. 1 and 2, when in use and providing its intended safeguarding function.

Pneumatic means, such as any known compressor 20 is, as best shown in FIG. 2, typically connected to a housing cylinder bottom connection 22 to cause pressure air to urge a piston 24 of the lightning rod 12 in ascending movement changing its positional status from concealed to deployed. Reversing the positional status is achieved using pressure air from the compressor 20 introduced through a housing cylinder top connection 26. Air lines, individually and collectively designated 28 are connected from the compressor 20 to the cylinders 18 via a known solenoid valve 30 which allows pressure air flow to the connections 22 or 26, as needed.

The positional status change from concealed to positions of deployment occur when a roof-located lightning detecting device 32, i.e. a device which monitors approaching atmospheric storm conditions that might result in a storm with lightning phenomena of any known type as might be inferred from U.S. Pat. No. 1,221,723 issued on Apr. 3, 1917, provides an electrical signal via an electrical connection 34 to a programmable logic controller 36 which, in turn, via an electrical connection 38 causes the operation of the solenoid valve 30 resulting in pressure air flow into the bottom housing connection 22 and corresponding ascending movement of the lightning rods 12.

To better understand the utility of the means for testing the operability of the lightning protection system above generally described and which testing means is the within patentable advance, it is to be noted from the National Fire Protection Association of Quincy, Mass., which is a private organization that establishes fire protection codes for dwellings, buildings, and like structures that in the Long Island geographical area in a typical year there are only about twenty storms that will require the use of a lightning rod. It is also to be noted that the lightning rods in their raised position constitute an eyesore and thus are not desirable from an aesthetic point of view particularly if installed on a very expensive home in a very exclusive neighborhood. Additionally, the lightning rods in a raised condition constitute a significant safety hazard to workmen who may be working on the roof. The aforesaid and other shortcomings are obviated by the testing means according to the present invention now to be described.

Operating independently of the storm detecting device 32 is a known ambient light sensor 40 operatively effective to signal via an electrical connection 42 to the programmable logic controller 36 to in turn cause operation of the solenoid valve 30 and a positional change of the concealed lightning rods 12 into their deployed positions, this functioning of the light sensor 40 being on a programmed schedule of date certain, such as for example, once a month, but always during diminished ambient light conditions, such as dark evenings and at night, and thus at times when the raised lightning rods 12 are not an eyesore or there are not likely to be workmen on the roof 16. A known timer 44 connected to the programmable logic controller 36 is the preferred manner of scheduling the test dates.

Operating in conjunction with the light sensor 40 is a micro switch 46 located within and adjacent the top of the housing cylinder 18 and thus in the path of the ascending movement of the piston 24. Contact of piston 24 against the switch button 48 will result in a signal transmitted via the connection 50 to the programmable logic controller 36 to reverse the positional status of the rods 12 after a short time delay of perhaps ½ an hour, again using the timer 44. More important, the physical contact of piston 24 against the switch button 48 provides verification that the lightning rod 12 is operating as intended, and has not suffered any malfunction during its time interval of non-use.

If a verifying signal is not transmitted to the programmable logic controller 36 from the micro switch 46, controller 36 is programmed to cause the operation of a sound alarm 52 to alert the dweller and/or to signal via a telephone line 54 a service company that there is a malfunction in the lightning protection system.

Although from the foregoing description the construction, components and operating mode of the within inventive means for testing the operability of a lightning protection system should be readily understood, for completeness' sake it is noted that attached to a cable clamp 56 of each cylindrical housing 18 is a grounding cable denoted by the dashed line 58, connected to an underground lightning grounding rod 60 to which in a known manner obviates any adverse consequence of a lightning strike. Also, use is advantageously made of a monitor board 62 connected, as at 64, to operate indicator display lights 66 to indicate after a test to a serviceman which of the rods are operable and which are not operable, and having a connection 68 to the controller 36 and a light display thereof displaying this same information. Lastly, it is to be noted that the operation of the compressor 20 is in accordance with a pressure regulator 70 and, as is typical, includes a reservoir of pressure that is put to use in case line power is lost during an approaching storm so that the safeguarding of the dwelling from lightning strikes is assured.

As already noted, typically fifteen lightning rods 12 are used for averting lightning damage, which is really fire damage resulting from the electrical discharge attempting to bridge a gap and being manifested as an arc, each rod being typically ½" in diameter and from 12" to 14" long and in its deployed position raised approximately 10" above the roof line 14.

It is known that pneumatics and hydraulics are in many respects equivalent technologies and thus in the circumstances described it will be understood that references to one in the description and in the claims are intended to be references to the other.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for an operative lightning protection system of a type having at least one lightning rod with an operative retracted position of concealment when not in use and an operative raised position of deployment when in use, and pneumatic means for urging said lightning rod in movement between said operative positions only incident to approaching atmospheric storm conditions requiring a grounding of a lightning strike to said lightning rod, said improvements consisting of means for testing the operability of said lightning protection system during an interval prior to use comprising a selectively operated diminished ambient light sensing means, a movement-detecting means having an operative position disposed along said path of movement of said lightning rod at a location correlated to said raised position of deployment thereof, first and second signal-transmitting means connected from said diminished ambient light sensing means and from said movement-detecting means to said pneumatic means of said lightning rod operatively effective in sequence to initiate the lightning rod deployment operation of said pneumatic means in response to a transmitted signal of said first signal-transmitting means and to initiate the lightning rod retraction operation of said pneumatic means in response to a transmitted signal of said second signal-transmitting means, whereby on a selected schedule said pneumatic means is operative in a mode testing the operability of the lightning protection system occurring during diminished ambient light conditions when the raising of said lightning rod into said deployed condition is neither a safety hazard to workers in the vicinity nor presenting an undesirable display to individuals in the view thereof.

* * * * *